(12) United States Patent
Kuehlcke et al.

(10) Patent No.: US 9,908,588 B2
(45) Date of Patent: Mar. 6, 2018

(54) VEHICLE WITH ELECTRIC AUXILIARY DRIVE AND CONTINUOUSLY VARIABLE PLANETARY GEAR UNIT

(71) Applicant: Robert Bosch GmbH, Stuttgart (DE)

(72) Inventors: Torsten Kuehlcke, Nuertingen (DE); Juergen Hilzinger, Renningen (DE); Peter Kimmich, Steinenbronn (DE); Markus Hintekausen, Schwieberdingen (DE); Andre Meyer, Remseck (DE)

(73) Assignee: Robert Bosch GmbH, Stuttgart (DE)

( * ) Notice: Subject to any disclaimer, the term of this patent is extended or adjusted under 35 U.S.C. 154(b) by 71 days.

(21) Appl. No.: 14/913,762

(22) PCT Filed: Jul. 8, 2014

(86) PCT No.: PCT/EP2014/064609
§ 371 (c)(1),
(2) Date: Feb. 23, 2016

(87) PCT Pub. No.: WO2015/024701
PCT Pub. Date: Feb. 26, 2015

(65) Prior Publication Data
US 2016/0221635 A1    Aug. 4, 2016

(30) Foreign Application Priority Data

Aug. 23, 2013  (DE) .................. 10 2013 216 750
Oct. 8, 2013   (DE) .................. 10 2013 220 299

(51) Int. Cl.
*B62M 6/55*   (2010.01)
*B62M 11/14*  (2006.01)
*B62M 11/18*  (2006.01)
*F16H 15/00*  (2006.01)

(52) U.S. Cl.
CPC .............. *B62M 6/55* (2013.01); *B62M 11/14* (2013.01); *B62M 11/145* (2013.01); *B62M 11/18* (2013.01)

(58) Field of Classification Search
None
See application file for complete search history.

(56) References Cited

U.S. PATENT DOCUMENTS

| | | |
|---|---|---|
| 5,167,591 A | 12/1992 | Cowan |
| 8,393,989 B2 | 3/2013 | Pohl |
| 2011/0303474 A1* | 12/2011 | Kimmich ................. B62M 9/04 180/206.3 |

(Continued)

FOREIGN PATENT DOCUMENTS

| | | |
|---|---|---|
| CN | 201 179 951 | 1/2009 |
| DE | 10 1009 046867 | 5/2011 |

(Continued)

*Primary Examiner* — Colby M Hansen
(74) *Attorney, Agent, or Firm* — Norton Rose Fulbright US LLP; Gerard Messina

(57) ABSTRACT

A vehicle drivable by motor power and/or pedal power, in particular to an electric bicycle, including: a crank mechanism having a crank spindle; an output drive element that delivers a drive torque for the vehicle, in particular to a chain or the like; an electric drive system having a reduction linkage; and a steplessly adjustable planetary linkage, an output element of the steplessly adjustable planetary linkage transferring the drive torque to the output drive element.

17 Claims, 11 Drawing Sheets

(56) References Cited

U.S. PATENT DOCUMENTS

2012/0309579 A1 12/2012 Miller et al.

FOREIGN PATENT DOCUMENTS

| DE | 10 2012 109637 | 4/2013 |
|----|----------------|--------|
| WO | WO 2006/035215 | 4/2006 |
| WO | WO 2010/001362 | 1/2010 |
| WO | WO 2012/030213 | 3/2012 |

* cited by examiner

VEHICLE WITH ELECTRIC AUXILIARY DRIVE AND CONTINUOUSLY VARIABLE PLANETARY GEAR UNIT

FIELD OF THE INVENTION

The present invention relates to a vehicle having an electric auxiliary drive system which is drivable by motor power and/or pedal power, in particular to an electric bicycle, having a steplessly adjustable planetary linkage.

BACKGROUND INFORMATION

Vehicles drivable by motor power and/or pedal power are known, for example, as electric bicycles, e.g. "pedelecs." There are electric bicycles in which the electric drive system is disposed in the region of the bottom bracket (central motor concept). A rear wheel is then driven via a chain. A shifting device, for example a derailleur system or a hub gear system or the like, can be disposed on the rear wheel. A stepless hub gear system as described, for example, in US 2012/0309579 A1 is also known.

The shifting devices most often disposed on the rear wheel each have discontinuities between the individual gear ratios. A shifting device disposed on the bicycle, in particular an electric bicycle, can be controlled automatically. The two systems—the shifting device disposed on the rear wheel, and the electric drive system with motor assistance and driver input sensing—work sequentially and are not optimally matched to one another, especially in a context of automatically regulated shifting devices and when discontinuities exist between the gear ratios. The high weight in particular of hub gear systems on the rear wheel does not represent an optimum weight distribution in terms of handling, suspension, and riding dynamics. In addition, removal and installation of the rear wheel having a shifting device is often very complex and cost-intensive.

SUMMARY OF THE INVENTION

The vehicle according to the present invention drivable by motor power and/or pedal power, in particular an electric bicycle, having the features described herein has, in contrast thereto, the advantage that integration of a steplessly adjustable (automatic) transmission into a drive unit at the bottom bracket, which may be in one common housing, is possible. Optimum matching between the electric drive system and the shifting device can thereby, in particular, be achieved. It is also possible according to the present invention to dispense with a separate shifting device on the rear wheel of the vehicle. The aspect according to the present invention combines the electric drive system having a reduction linkage for stepping down the rotation speed of the motor, with a planetary linkage having a steplessly adjustable conversion ratio in the region of the crank mechanism of the vehicle.

A particularly compact and lightweight configuration is thereby achieved. In particular, various components can be used jointly by the electric drive system and the shifting device, so that a parts count can be reduced. In an electric bicycle in particular, a low, central center of gravity and a lighter rear wheel are achieved, for improved handling and suspension and for improved riding dynamics. In addition, the rear wheel can easily be removed and installed. This is achieved according to the present invention by the fact that a steplessly adjustable planetary linkage is used. A "steplessly adjustable planetary linkage" is understood according to the present invention as a linkage in which an input disk, an output disk, and rotating and tiltable balls are present. Also present is an axially movable central positioning member that can pivot an axis of the balls around a ball center point. The result is to change the diameter, relevant for the conversion ratio, between the balls and the input disk or output disk. A step-up ratio and/or step-down ratio can thereby be steplessly furnished. A transition between the relevant diameters of the balls occurs continuously over the ball surface. Adjustment of the ball axis may be accomplished by way of a positioning drive.

The present invention thus makes possible integration of a steplessly adjustable planetary linkage of this kind with an electric drive system and with a reduction linkage in the region of a crank mechanism of the vehicle. A particularly compact configuration is thereby obtained; in particular, a separate shifting device on the rear wheel of the vehicle can be omitted.

The further descriptions herein present refinements of the present invention.

An input element of the steplessly adjustable planetary linkage may be connected to the crank mechanism and/or to the electric drive system, which has a reduction linkage for stepping down the rotation speed of the motor. Also, an output element of the steplessly adjustable planetary linkage may be connected to an output drive element, in particular to a chainring. Also, a pedal drive torque applied by a rider and an electric drive torque applied by the electric drive system may be introduced via the same input element of the steplessly adjustable planetary linkage. Summing of the two torques thus may occur before the steplessly adjustable planetary linkage, since a reduction linkage for stepping down the rotation speed of the motor advantageously has a fixed conversion ratio matched to the rider pedaling frequency. A further advantage is that a stepless change in conversion ratio is possible both when exclusively pedal drive torque is present or when exclusively electric drive torque is present.

The steplessly adjustable planetary linkage can be disposed concentrically around the crank spindle or with its center axis parallel to the crank axis. A concentric disposition means a particularly compact configuration. A disposition extending parallel to the crank spindle, on the other hand, has the particular advantage of a modular configuration of the bottom bracket, in which a conventional crank mechanism not having an integrated shifting system can be simply and inexpensively upgraded, in accordance with a modular system, to a system having an integrated steplessly adjustable planetary linkage.

Also, the steplessly adjustable planetary linkage may have an input element upstream from which is a linkage, in particular a spur-gear linkage or a second planetary linkage or a worm-gear linkage. The second planetary linkage can likewise be a steplessly adjustable planetary linkage, as well as a conventional planetary gearbox, shiftable in steps or having a fixed conversion ratio, having a sun gear, planets, planet carriers, and a ring gear which are embodied as gear wheels. The upstream linkage is additionally connected to the reduction linkage of the electric drive system and/or to the crank mechanism. Gear wheels may be used in shared fashion. Additionally, the steplessly adjustable planetary linkage additionally may have an output element downstream from which is a further linkage, in particular a spur-gear linkage or a planetary linkage. The downstream planetary linkage can also be a steplessly adjustable planetary linkage as well as a conventional planetary gearbox, shiftable in steps or having a fixed conversion ratio, having a sun gear, planets, planet carriers, and a ring gear which are embodied as gear wheels.

For a particularly compact disposition with high ground clearance, possible in particular in the region of the crank mechanism, which may be the electric drive system and the steplessly adjustable planetary linkage are disposed on one common side of the bottom-bracket spindle, in particular above the bottom-bracket spindle. For a particularly compact disposition in which the entire drive system having a motor, reduction linkage, and steplessly adjustable planetary linkage may be maximally concealed by a chainring in terms of visibility, both the steplessly adjustable planetary linkage and an upstream and/or downstream further linkage are disposed concentrically around the bottom-bracket spindle.

Also, the electric drive system may be disposed inside the steplessly adjustable planetary linkage. Alternatively, the electric drive system is disposed outside the steplessly adjustable planetary linkage, in particular above the steplessly adjustable planetary linkage. A higher ground clearance in the region of the crank mechanism can thereby once again be achieved.

According to a further embodiment of the present invention, a bottom-bracket spindle of the crank mechanism and a center axis of the output drive element, e.g. a center axis of the chainring, are not coincident. This makes it possible for the bottom-bracket spindle to be disposed as a lowest component and for the electric drive system and the steplessly adjustable planetary linkage to be disposed above the bottom-bracket spindle, so that a center axis of the chainring can also be disposed above the bottom-bracket spindle.

A further integrated assemblage is achieved by the fact that the electric drive system is connected, in a coaxial disposition with respect to the center axis of the chainring and to the center axis of the steplessly adjustable planetary linkage, to a second gear-type planetary linkage, an output drive of the second planetary linkage being connected to the sun gear of the steplessly adjustable planetary linkage. The sun gear of the steplessly adjustable planetary linkage may be embodied as a ring gear for the second internally located planetary linkage. Delivery of the drive torque of the electric motor, for example, into the sun gear of the steplessly adjustable planetary linkage, and thus the summing of the motor torque and rider torque, thus occur inside the steplessly adjustable planetary linkage. Compactness of the drive can thereby be further improved.

In order to ensure that the steplessly adjustable planetary linkage can be used even in a context of exclusively muscle-based operation, which may be the output drive element, e.g. the chainring, is disposed on a hollow shaft.

In an embodiment the crank mechanism is coupled via a freewheel to an input element of the steplessly adjustable planetary linkage. The output drive element, e.g. the chainring, is mounted freely rotatably around the crankshaft. The result is that in a drive context, the crank mechanism is always connected via the steplessly adjustable planetary linkage to the output drive element. Upon backpedaling the freewheel decouples the crank mechanism from the drive train; in particular, a braking effect cannot be produced by the motor, and the motor is protected from a sudden reversal of direction.

A further embodiment of the invention is the placement of the output drive element, in particular the chainring, on the input element side of the steplessly adjustable planetary linkage. The input and output drive are now located on the same side of the steplessly adjustable planetary linkage, and flange-mounting onto existing structures is thereby promoted. With this placement in particular, attachment of the output element of the steplessly adjustable planetary linkage onto the output drive element, in particular the chainring, can also be accomplished via belt drive.

Adjustment of the steplessly adjustable planetary linkage may be performed by way of a positioning drive. The steplessly adjustable planetary linkage can thereby take over the function of an automatic or automatable bicycle shifting system. Also, the reduction linkage of the electric drive system may be a spur-gear linkage or a gear-based planetary linkage or a worm-gear linkage. Also, an additional linkage may be disposed between the reduction linkage of the drive system and the steplessly adjustable planetary linkage. Particularly the reduction linkage and the additional upstream linkage may have common parts, for example a common gear wheel. According to a further embodiment of the invention a further downstream linkage is provided at the output element of the steplessly adjustable planetary linkage, before the output drive element (chainring). The upstream and/or downstream linkage may be embodied as a belt drive.

The aspect according to the present invention may be used particularly in conjunction with an electric bicycle having a central motor drive system. The electric drive system is disposed in the region of the crank mechanism and it is possible that, for example, a bicycle manufacturer can be furnished with a complete module encompassing the electric drive unit as well as the stepless linkage constituting an automatic shifting device. The electric drive system and the stepless linkage can be optimally matched to one another in such a module.

Exemplifying embodiments of the invention will be described in detail below with reference to the accompanying drawings. Identical or functionally identical parts are labeled with identical references characters in the drawings.

DETAILED DESCRIPTION

An electric bicycle 1 according to a first exemplifying embodiment of the invention will be described in detail below with reference to FIGS. 1 and 2.

Figure 1:
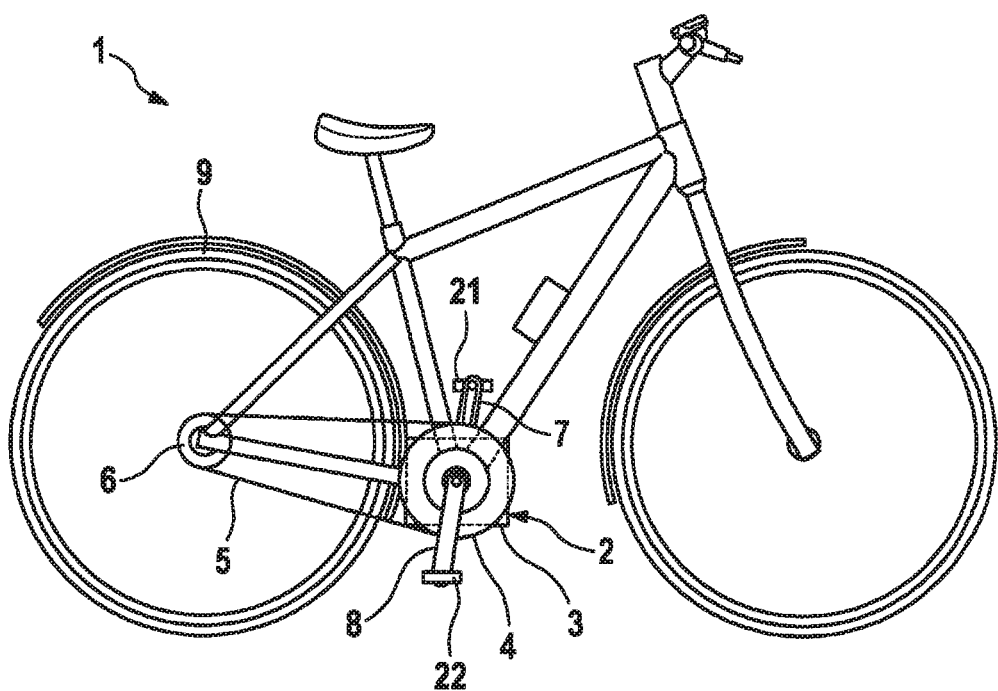
FIG. 1 schematically depicts an electric bicycle according to a first exemplifying embodiment of the invention.

As is evident from FIG. 1, electric bicycle 1 encompasses a crank mechanism 2 having two cranks 7, 8 and two pedals 21, 22. Reference character 20 refers to a crank spindle (see FIG. 2). An electric drive system 3 is integrated into crank mechanism 2. A sprocket 6 is disposed on a rear wheel 9.

A drive torque is transferred from a chainring 4 via a chain 5 to sprocket 6.

Figure 2:
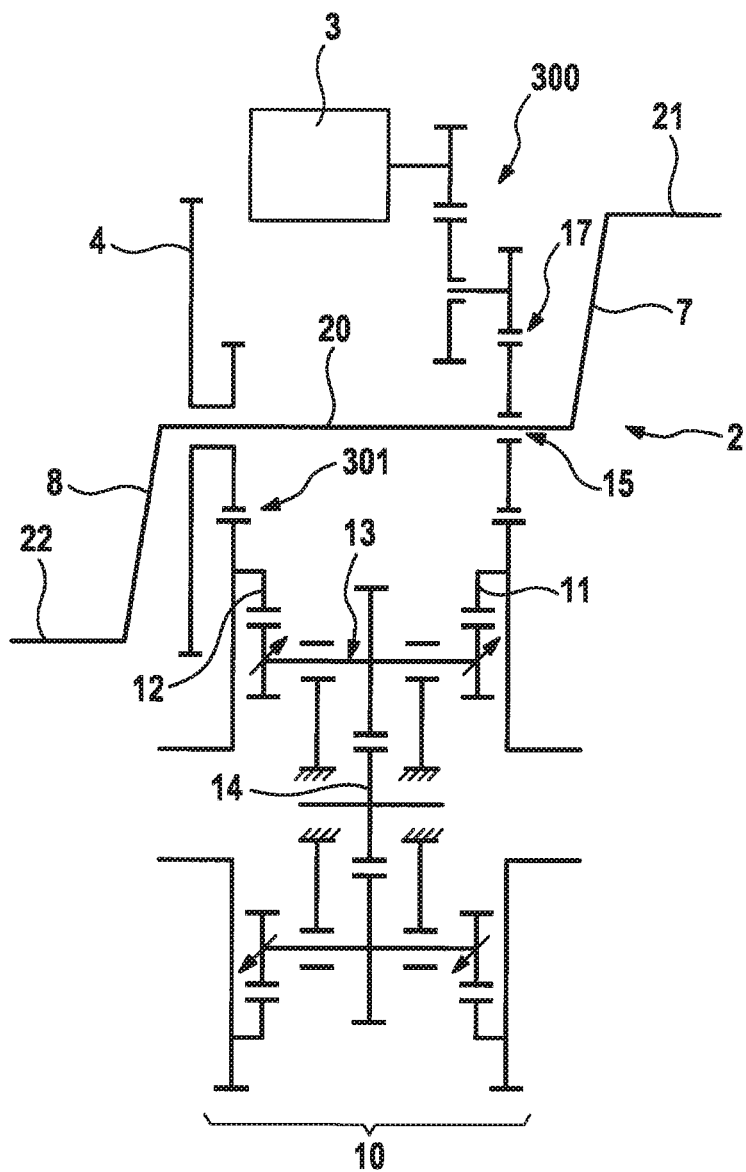
FIG. 2 schematically depicts a drive unit according to the present invention in accordance with the first exemplifying embodiment, having an electric drive system and a steplessly adjustable planetary linkage.

The drive unit is depicted in detail in FIG. 2. Both a drive torque furnished by electric drive system 3, and a pedal torque, can be delivered to chainring 4.

As is evident from FIG. 2, a steplessly adjustable planetary linkage 10 is disposed between chainring 4 and crank spindle 20. The connection between crank spindle 20 and steplessly adjustable planetary linkage 10 is made via a first freewheel 15 which ensures that upon forward pedaling the steplessly adjustable planetary linkage is entrained, and upon backpedaling no torque is transferred to chainring 4. Upstream from an input element 11 of steplessly adjustable planetary linkage 10 is a spur-gear linkage 17 that establishes the connection to crank spindle 20 and to a reduction linkage 300 of electric drive system 3. That spur gear of the linkage upstream from input element 11 which is mounted on crank spindle 20 is simultaneously also a constituent of the reduction linkage of electric drive system 3. A further spur-gear linkage 301 is located downstream from output element 12 of steplessly adjustable planetary linkage 10, and establishes the connection to chainring 4.

The steplessly adjustable planetary linkage is a steplessly adjustable positioning device having input element 11, output element 12, a plurality of rotating and tiltable balls 13, and a central positioning member 14 that also serves as a rolling surface for the balls. As a result of the tilting of balls 13, a conversion ratio can be achieved between the input drive side and output drive side (chainring). Stepless gear shifting for electric bicycle 1 is thus possible, so that a gear shifting system at the rear wheel of the bicycle can be omitted.

A traction fluid is disposed between input element 11 and output element 12 and in particular in the contact region between balls 13 and input element 11 and output element 12, in order to enable torque transfer.

Because of the connection via spur-gear stages, electric drive system 3 and steplessly adjustable planetary linkage 10 can be disposed on crank spindle 20 at almost any angle with respect to one another e.g. 180°. The angle range is limited by the dimensions of the individual components and the maximum ground clearance to be achieved. The connection via two spur-gear stages furthermore favors a modular construction in which steplessly adjustable planetary linkage 10 can easily be added, using a modular system, to a conventional configuration not having an integrated shifting system.

According to the present invention a steplessly adjustable gear shifting system, and electric drive system 3 having a reduction linkage, are thus integrated onto crank mechanism 2. A common housing may be provided for crank mechanism 2, for electric drive system 3 having a reduction linkage, and for steplessly adjustable planetary linkage 10. It is thereby possible to furnish a compact, pre-assemblable unit that can mounted in simple fashion on existing bicycle frames.

Steplessly adjustable planetary linkage 10 is schematically depicted in FIG. 2. The various positions of each ball 13 are respectively indicated, via the respective arrow denoting adjustability, as three gears having a variable diameter for the two outer gears. The balls are held in a cage that corresponds substantially to the planet carrier of a usual planetary gearbox. Central positioning member 14 can be adjusted in an axial direction by way of an actuator (not shown), and corresponds to the sun gear of a usual planetary gearbox.

Figure 3:
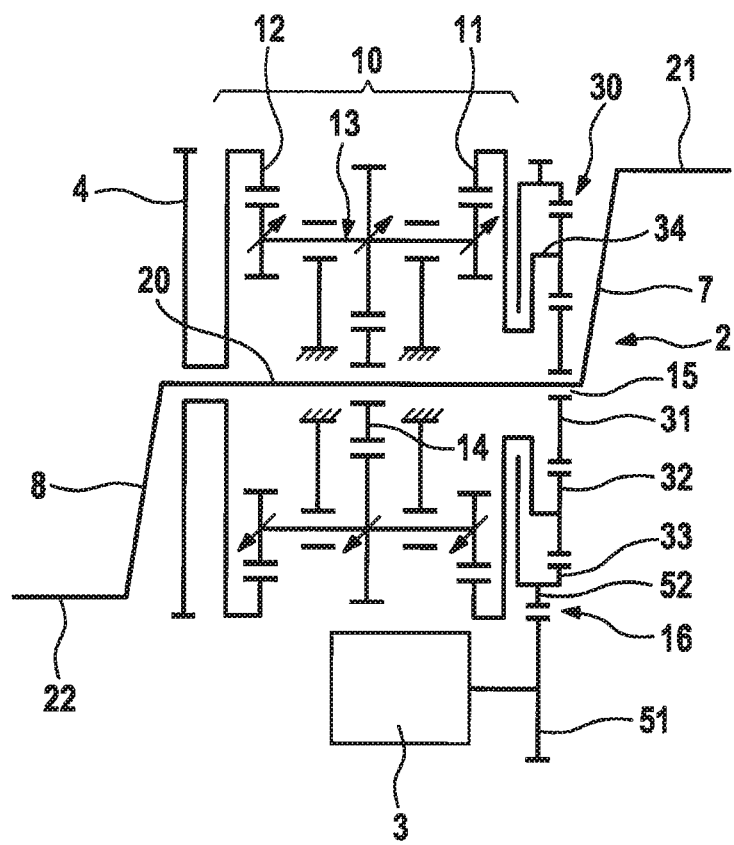
FIG. 3 is a schematic view of a drive unit according to a second exemplifying embodiment of the invention.

FIG. 3 shows a crank mechanism for an electric bicycle according to a second exemplifying embodiment of the invention. Crank mechanism 2 of the second exemplifying embodiment corresponds substantially to that of the first exemplifying embodiment; a conventional (gear-based) planetary gearbox 30 having a sun gear 31, planets 32, and a ring gear 33 is additionally provided. Electric drive system 3 is connected, via a first spur-gear set 16 having gears 51, 52, to ring gear 33 of planetary gearbox 30. Input element 11 is connected to a planet carrier 34 of planetary gearbox 30. Sun gear 31 is disposed via a freewheel on crank spindle 20. A drive torque generated by pedaling can thus be introduced via sun gear 31 into the conventional planetary gearbox 30, and transferred from there via steplessly adjustable planetary linkage 10 to chainring 4. A drive torque applied by electrical drive system 3 is introduced via ring gear 33 into planetary gearbox 30, and transferred from there via steplessly adjustable planetary linkage 10 to chainring 4. In the second exemplifying embodiment, steplessly adjustable planetary linkage 10 is disposed concentrically around crank spindle 20. The result is that a particularly compact configuration can be achieved especially in a radial direction. In addition, the use of planetary gearbox 30, in particular in a shiftable embodiment (not shown), allows a wider total spread of the variable conversion ratio to be obtained.

Figure 4:
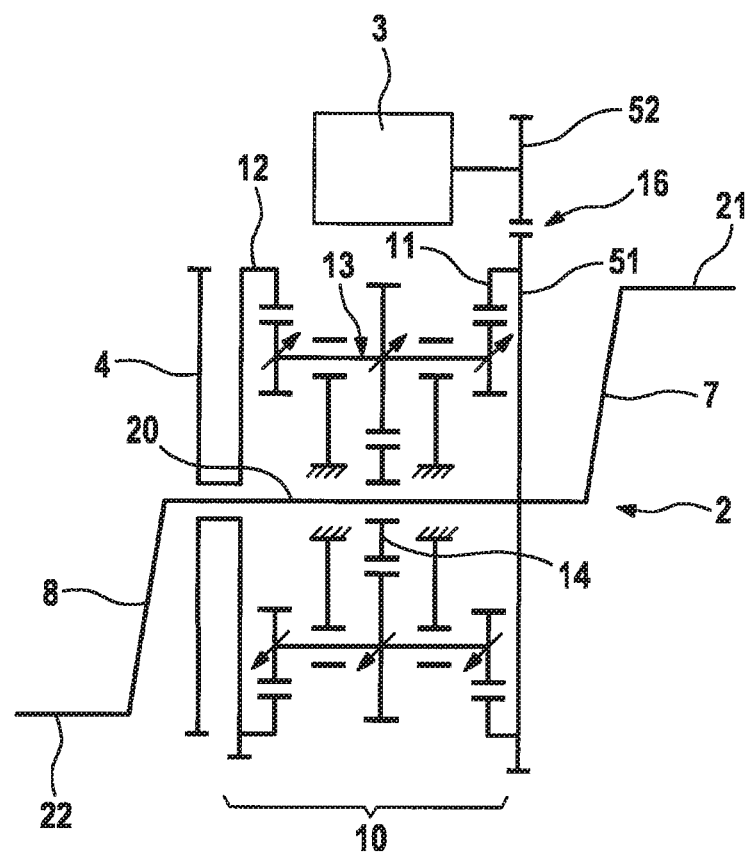
FIG. 4 is a schematic view of a drive unit according to a third exemplifying embodiment of the invention.

FIG. 4 shows a drive unit of an electric bicycle according to a third exemplifying embodiment of the invention. As is evident from FIG. 4, steplessly adjustable planetary linkage 10 is again disposed concentrically around crank spindle 20. Electric drive system 3 is disposed outside steplessly adjustable planetary linkage 10. Electric drive system 3 can in particular be disposed above steplessly adjustable planetary linkage 10 so that a maximum ground clearance height exists in the region of crank mechanism 2. Central positioning member 14 (sun gear) of steplessly adjustable planetary linkage 10 is free-mounted. A first spur-gear set 16 having gears 51, 52 is also provided, electrical drive system 3 being connected to gear 52 and crank spindle 2 being connected to gear 51. Gear 51 is in turn connected to input element 11 of the steplessly adjustable planetary linkage.

Figure 5:
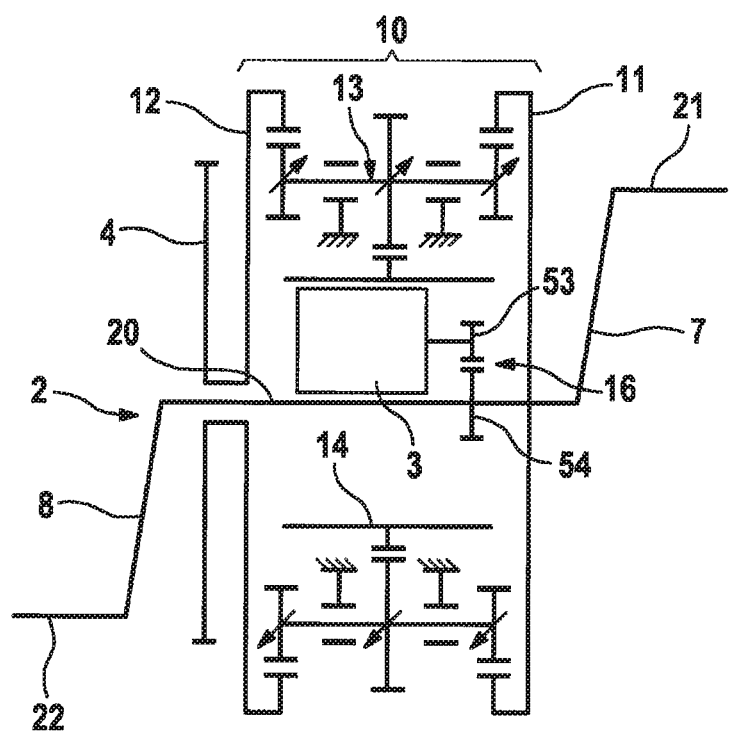
FIG. 5 is a schematic view of a drive unit according to a fourth exemplifying embodiment of the invention.

FIG. 5 shows a fourth exemplifying embodiment of the invention in which electric drive system 3 is disposed inside steplessly adjustable planetary linkage 10. Electric drive system 3 is connected, via a spur-gear set 16 having gears 53, 54, to crank spindle 20. Crank spindle 20 is connected via input element 11 to steplessly adjustable planetary linkage 10. Electric drive system 3 can be disposed above crank spindle 20. It is also possible, however, to dispose electric drive system 3 in any angular position.

Figure 6:
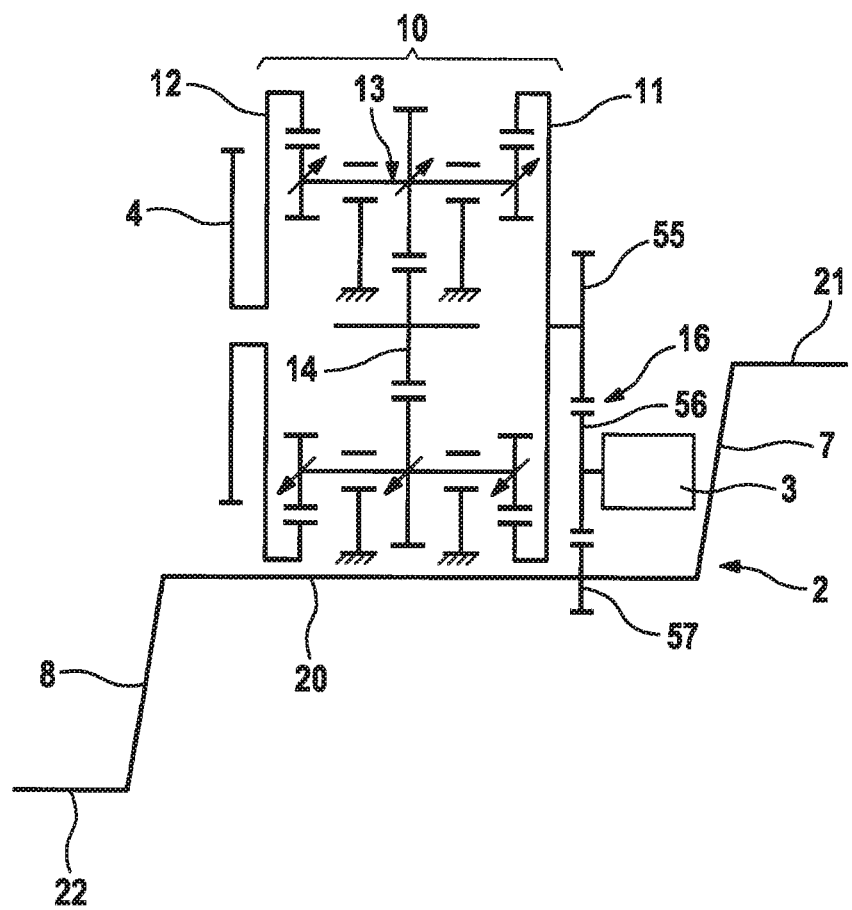
FIG. 6 is a schematic view of a drive unit according to a fifth exemplifying embodiment of the invention.

FIG. 6 shows an exemplary embodiment according to a fifth exemplifying embodiment of the invention. In this embodiment a non-coaxial disposition of crank spindle 20 and of chainring 4 is present. A center axis of chainring 4 is parallel to crank spindle 20. A connection from crank spindle 20 to steplessly adjustable planetary linkage 10, which is inserted between crank spindle 20 and chainring 4, is effected via several spur-gear stages 16 having gears 55, 56, 57. Electric drive system 3 drives the center gear 56. Gear 57 is disposed on crank spindle 20 and meshes with gear 56. Gear 55 is connected to input element 11 of steplessly adjustable planetary linkage 10. Central positioning member 14 is mounted freely rotatably. In this exemplifying embodiment electric drive system 3 can also be disposed in other positions, for example on crank spindle 20 or on gear 55.

Electric drive system 3 and crank spindle 20 can also, for example, exchange positions, so that electric drive system 3 is connected to gear 57 and crank spindle 20 to gear 56. In accordance with the rotation speed of electric drive system 3 and with the distance to be spanned between crank spindle 20 and input element 11, any number of spur-gear stages can be used for the connection from crank spindle 20 to steplessly adjustable planetary linkage 10. Electric drive system 3 can also be disposed, via a further spur-gear stage, above gear 55 and with no connection to gear 56.

Figure 7:
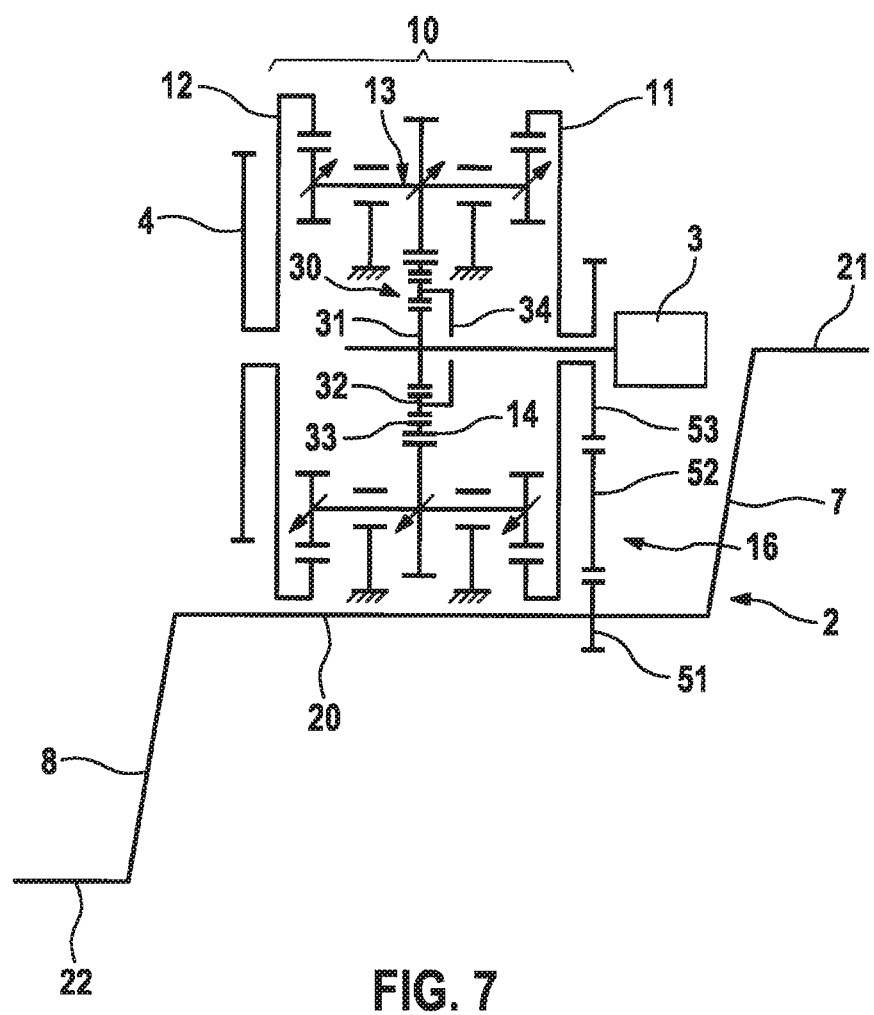
FIG. 7 is a schematic view of a drive unit according to a sixth exemplifying embodiment of the invention.

FIG. 7 shows a sixth exemplifying embodiment of the invention. In this exemplifying embodiment electric drive system 3 is disposed coaxially with respect to the center axis of chainring 4 and with respect to the center axis of steplessly adjustable planetary linkage 10, and is connected via an additional conventional planetary gearbox 30 to steplessly adjustable planetary linkage 10. An output (ring gear 33) of conventional planetary gearbox 30 is connected to central positioning member 14 or the sun gear of steplessly adjustable planetary linkage 10. The sun gear or central positioning member 14 of steplessly adjustable planetary linkage 10 is embodied as a ring gear 33 for conventional planetary gearbox 30. Conventional planetary gearbox 30 is thus disposed inside central positioning member 14 (sun gear). Crank spindle 20 and the center axis of chainring 4 are once again disposed not coaxially but with a parallel offset from one another. A high ground clearance at the crank mechanism can be achieved, in particular, with this disposition, since electric drive system 3 and the gear shifting system are disposed above crank spindle 20.

Figure 8:
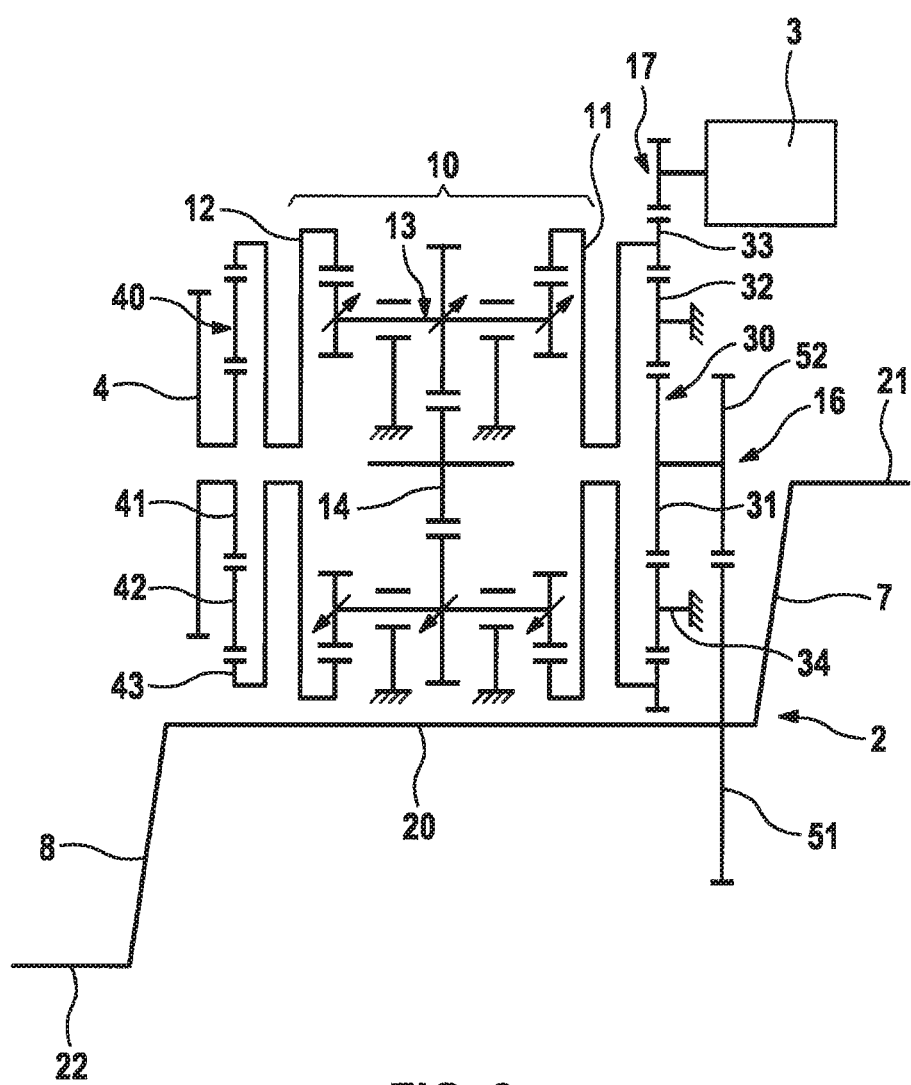
FIG. 8 is a schematic view of a drive unit according to a seventh exemplifying embodiment of the invention.

FIG. 8 shows a seventh exemplifying embodiment of the invention. The seventh exemplifying embodiment has a first conventional planetary gearbox 30, a second conventional planetary gearbox 40, and steplessly adjustable planetary linkage 10. First conventional planetary gearbox 30 is disposed at the input to steplessly adjustable planetary linkage 10. Second conventional planetary gearbox 40, having sun gear 41, planets 42, and ring gear 43, is disposed at the output of steplessly adjustable planetary linkage 10. Second conventional planetary gearbox 40 is connected via its sun gear 41 to chainring 4. Sun gear 31 of first conventional planetary gearbox 30 is connected to crank spindle 20 via a spur-gear set 16 having gears 51, 52. Electric drive system 3 is connected, via a second spur-gear set 17, to ring gear 33 of first conventional planetary gearbox 30. The center axis of chainring 4 is once again offset in parallel fashion with respect to crank spindle 20.

This exemplifying embodiment as well has a very compact configuration. Thanks to the first conventional planetary gearbox 30 in combination with spur-gear linkage 16, the input rotation speed for steplessly adjustable planetary linkage 10 can advantageously be raised and the input torque can advantageously be lowered. This results in a more compact configuration for steplessly adjustable planetary linkage 10. A rotation speed at the output of steplessly adjustable planetary linkage 10 which is thus too high for chainring 4 is suitably reduced again by way of second conventional planetary gearbox 40.

Figure 9:
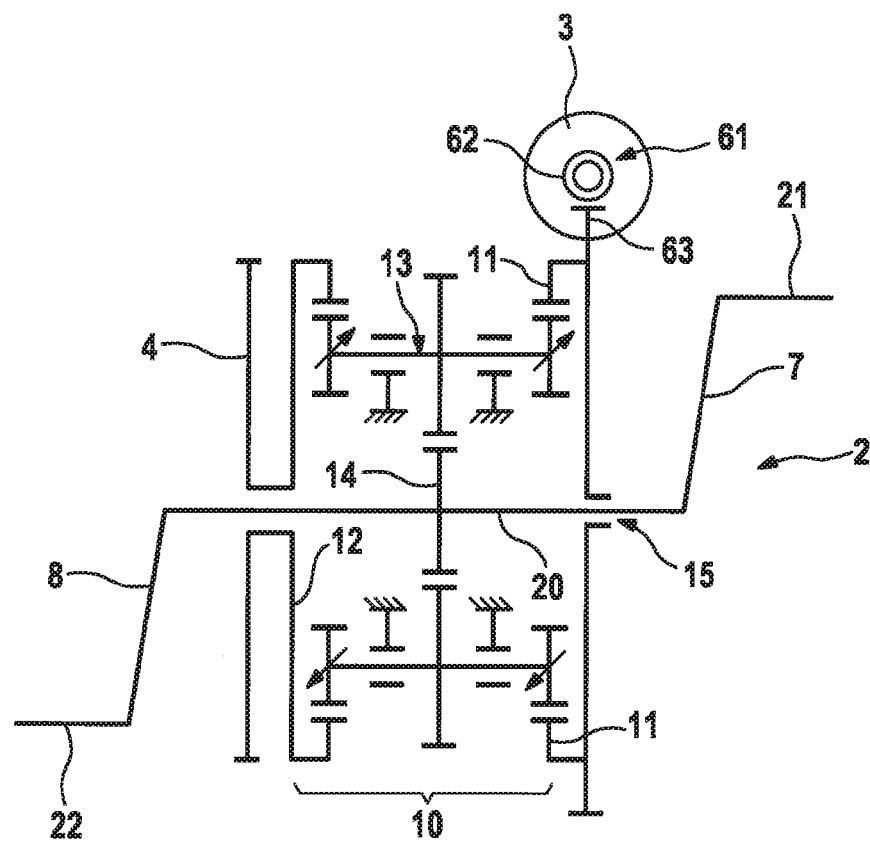
FIG. 9 is a schematic view of a drive unit according to a eighth exemplifying embodiment of the invention.

FIG. 9 shows an eighth exemplifying embodiment of the invention. In the eighth exemplifying embodiment electric drive system 3 is disposed with a 90° rotation with respect to crank spindle 20. A worm-gear linkage 61 having a worm 62 and worm wheel 63 is provided, and connects an input element 11 for steplessly adjustable planetary linkage 10 to electric drive system 3. The low noise output of worm-gear linkages as compared with spur-gear linkages or planetary linkages is especially advantageous here. Because a high conversion ratio of worm-gear linkage 61 in one stage is possible, a particularly compact motor with a high rotation speed and low torque can be used. Electric drive system 3 can in principle assume, over the circumference of the worm wheel, any desired angular position around crank spindle 20.

Figure 10:
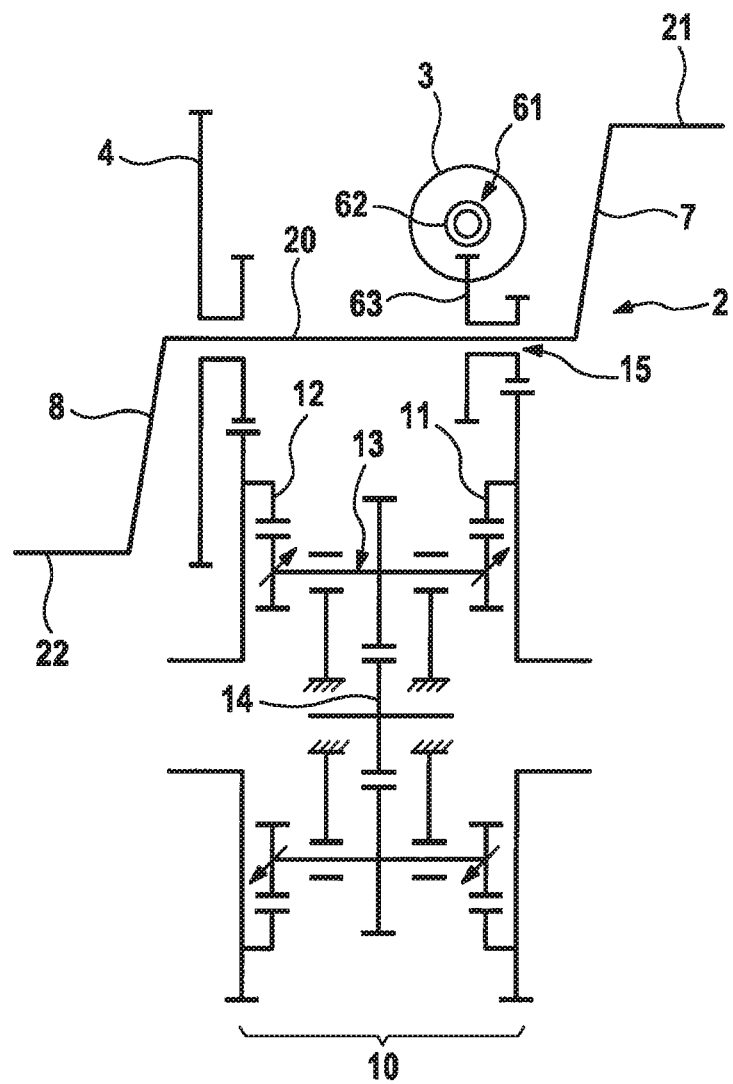
FIG. 10 is a schematic view of a drive unit according to a ninth exemplifying embodiment of the invention.

FIG. 10 shows a ninth exemplifying embodiment of the invention. Crank mechanism 2 of the ninth exemplifying embodiment corresponds substantially to that of the eighth exemplifying embodiment, a respective further spur-gear stage additionally being provided both between worm-gear linkage 61 and input element 11 for steplessly adjustable planetary linkage 10, and between output element 12 for steplessly adjustable planetary linkage 10 and chainring 4. This has the advantage that for a particularly compact configuration, electric drive 3 can be disposed centeredly along crank spindle 20. A non-coaxial disposition of crank spindle 20 and steplessly adjustable planetary linkage 10 exists with this exemplifying embodiment. In this embodiment, electric drive system 3 and steplessly adjustable planetary linkage 10 can assume almost any desired angle with respect to one another around crank spindle 20.

Figure 11:
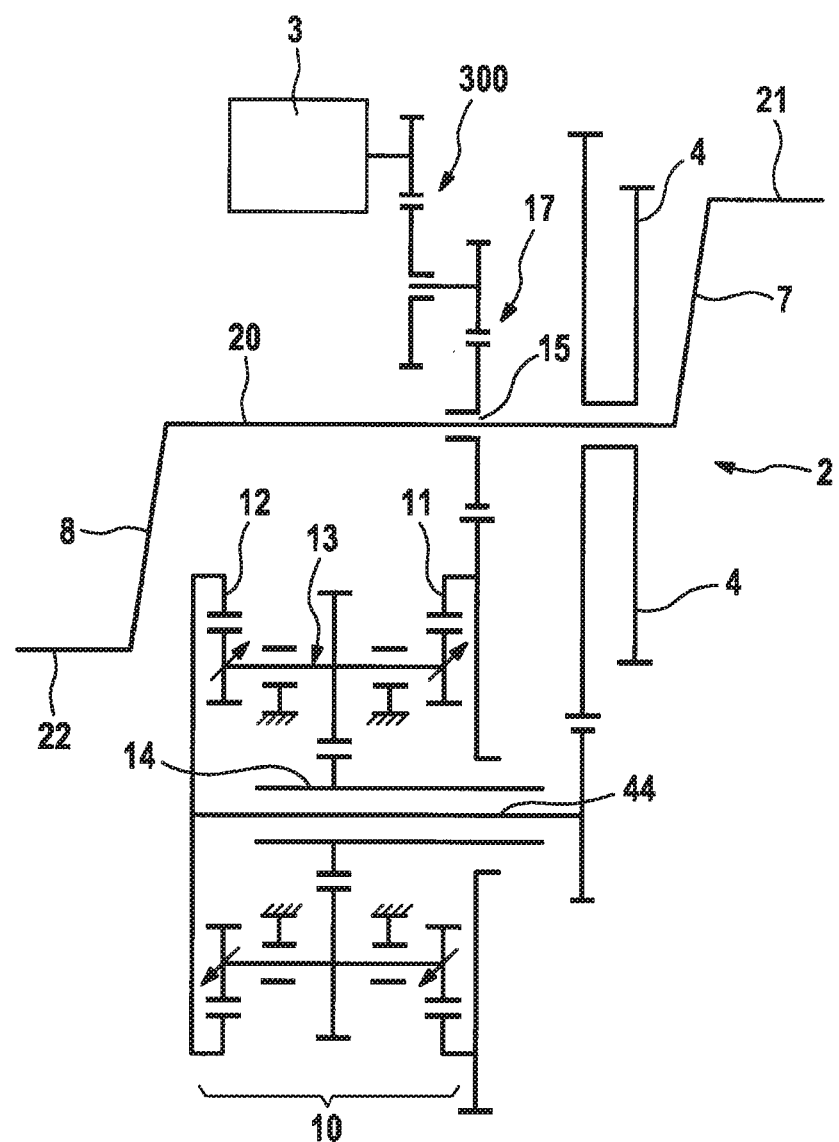
FIG. 11 is a schematic view of a drive unit according to a tenth exemplifying embodiment of the invention.

FIG. 11 shows an tenth exemplifying embodiment of the invention. In the tenth embodiment, an output element 12 for steplessly adjustable planetary linkage 10 is connected via a central shaft 44 of steplessly adjustable planetary linkage 10 to chainring 4 on the side of input element 11 for steplessly adjustable planetary linkage 10. The input drive to and output drive from steplessly adjustable planetary linkage 10 are thus located on the same side. Steplessly adjustable planetary linkage 10 is again disposed non-coaxially with respect to crank spindle 20. A further spur-gear stage, which connects the output shaft of steplessly adjustable planetary linkage 10 to chainring 4, is located for this purpose between chainring 4 and steplessly adjustable planetary linkage 10. In this exemplifying embodiment the further spur-gear stage for connecting the output shaft of steplessly adjustable planetary linkage 10 to chainring 4 can, in particular, alternatively also be replaced by a belt drive. The advantage of a belt drive is low noise emission and high efficiency.

What is claimed is:

1. A vehicle drivable by motor power and/or pedal power, comprising:
   a crank mechanism having a crank spindle;
   an output drive element disposed on the crank mechanism that delivers a drive torque for the vehicle;
   an electric drive system disposed on the crank mechanism, having a reduction linkage; and
   a steplessly adjustable planetary linkage disposed on the crank mechanism;
   wherein an output element of the steplessly adjustable planetary linkage is operable to transfer the drive torque to the output drive element, and
   wherein an input element of the steplessly adjustable planetary linkage is connected to the crank mechanism and to the electric drive system.

2. The vehicle of claim 1, wherein a linkage is upstream from the steplessly adjustable planetary linkage.

3. The vehicle of claim 1, wherein the electric drive system is located on the crank spindle opposite the steplessly adjustable planetary linkage at any angle.

4. The vehicle of claim 1, wherein the electric drive system and the steplessly adjustable planetary linkage are disposed on one common side of the crank spindle.

5. The vehicle of claim 1, wherein the electric drive system is disposed radially inside or radially outside the steplessly adjustable planetary linkage.

6. The vehicle of claim 1, wherein the crank spindle and a center axis of the output drive element are not coincident.

7. The vehicle of claim 1, wherein the electric drive system is connected to a conventional planetary gearbox, an output drive of the conventional planetary gearbox being connected to the steplessly adjustable planetary linkage.

8. The vehicle of claim 1, wherein the output drive element is disposed in freely rotatably mounted fashion on a hollow shaft surrounding the crank spindle.

9. The vehicle of claim 1, wherein the output drive element is disposed on the input element side of the steplessly adjustable planetary linkage.

10. The vehicle of claim 1, wherein the vehicle includes an electric bicycle.

11. The vehicle of claim 1, wherein the crank mechanism includes a chainring.

12. The vehicle of claim 1, wherein a linkage, in particular a spur-gear linkage or a planetary linkage or a worm-gear linkage, is upstream from the steplessly adjustable planetary linkage.

13. The vehicle of claim 1, wherein the electric drive system is located on the crank spindle opposite the steplessly adjustable planetary linkage at an angle of 180°.

14. The vehicle of claim 1, wherein the crank spindle and a center axis of the output drive element are not coincident and in particular are parallel to one another.

15. The vehicle of claim 1, wherein the electric drive system is connected to a conventional planetary gearbox, an output drive of the conventional planetary gearbox being connected to the steplessly adjustable planetary linkage, in particular to the central positioning member or sun gear.

16. The vehicle of claim 1, wherein the steplessly adjustable planetary linkage is a steplessly adjustable positioning device having a plurality of rotating and tiltable balls and a central positioning member.

17. The vehicle of claim 1, wherein the steplessly adjustable planetary linkage is a steplessly adjustable positioning device having an input element, an output element, a plurality of rotating and tiltable balls, and a central positioning member which serves as a rolling surface for the balls.

* * * * *